United States Patent Office 3,717,492
Patented Feb. 20, 1973

3,717,492
WATER-PERMEABLE BITUMINOUS COMPOSITIONS FOR HYDRAULIC ENGINEERING
Gerardus Rinkel, 's-Hertogenbosch, and Gijsbert van Doorn, Utrecht, The Netherlands, assignors to Bitumarin N.V., Zaltbommel, Netherlands
No Drawing. Filed Dec. 2, 1969, Ser. No. 881,608
Claims priority, application Netherlands, Dec. 16, 1968, 6818023
Int. Cl. C08h *13/00, 17/32;* C08j *1/46*
U.S. Cl. 106—280 R                               7 Claims

ABSTRACT OF THE DISCLOSURE

A water-permeable bituminous composition for hydraulic engineering purposes consists of a mixture of bituminous mortar and a stone fraction. The quantity of mortar in the mixture is less than the volume of voids between the stones of the stone fraction in the mixture. Further, the smallest size $D15$ of the stone in the stone fraction is from four (4) to sixteen (16) times the largest size $D85$ of the mineral matter contained in the mortar.

---

The invention relates to bituminous compositions for hydraulic engineering applications.

The term "bituminous mortar" as used hereinafter is understood to mean a mixture of bitumen with filler and either sand, stone fines, stone chippings or gravel or any combination thereof, the bitumen content of which is greater than corresponds to the volume of voids in between the mineral components. By bitumen is understood bitumen derived from petroleum, coal tar or coal tar pitch.

By sand and stone fines is understood mineral matter which is retained on a 0.075 sieve but passes a 2.4 sieve. The sieves are Netherlands standard sieves as defined in N 480 and N 574 (Netherlands Standards). Sand and stone fines according to the "Specifications laid down by Rijkswaterstaat (State Water Authority) for building materials in Road Construction 1967" may themselves also contain minor quantities of material which do not comply with the said sieve specifications. The terms "sand" and "stone fines" in the application should also be understood to have this meaning.

Gravel and stone chippings have a particle size greater than that of sand and stone fines. Filler has a particle size smaller than that of sand.

Bituminous compositions are frequently used for the coating of slopes, dams, dikes, bottoms of water courses or sea bottoms. Compositions of this type should be able to stand up to currents and wave action. They are applied on to a bottom layer which may be a natural bottom layer, for example a sand layer, or an artificial layer of sand, bituminized sand, gravel or stone rubble. Gravel and stone rubble are often applied on to a sand layer. The bituminous coating is generally formulated in such a way that it is impermeable to water principally from considerations of durability. This bituminous coating should further comply with two requirements: it should have sufficient strength (cohesion) to stand up to currents and wave action and it should be sufficiently thick (the weight must be high) to stand up to the water pressure which may occur underneath the bituminous coating.

On account of the large thicknesses required the above coatings are very expensive and for this reason a smaller thickness is sometimes selected than is required, viz. when the risk of damage arising under extreme conditions is less expensive than a coating which is sufficiently thick to stand up to the extreme conditions of water pressures and heavy wave action which hardly ever occur.

The invention relates to a water-permeable bituminous composition for hydraulic engineering applications, containing bitumen and mineral components, the composition comprising a mix of a bituminous mortar and a stone fraction, the smallest size $D15$ of the stone in the stone fraction, expressed in equivalent diameters, being 4–16 times the largest size $D85$ of the mineral matter of the mortar, and the quantity of mortar in the mixing being 10–30% by weight.

The invention also relates to a process for applying bituminous coatings on slopes, dams, dikes and bottoms of water courses and sea bottoms, in which process the bituminous compositions of the invention are used as bituminous coating.

By the smallest size $D15$ is meant the sieve mesh expressed in equivalent diameter through which 15% by weight of the stone fraction passes. By the largest size $D85$ is meant the sieve mesh expressed in equivalent diameter through which 85% by weight of the minerals passes.

The quantity of mortar in the composition is sufficient to coat the stones in the stone fraction completely, but not sufficient to fill the voids in between the stones as well. Since the stones in the stone fraction are completely coated by a mortar which is durable in itself, a stable and durable composition is obtained. The composition is water-permeable since the voids in between the stones are not or not completely filled; if use is made of mechanical compaction as a result of which the volume of the voids is reduced, the quantity of mortar should be so selected within the limits indicated that the coating resulting after compaction is also water-permeable.

In formulating the composition the motar is mixed with the stone fraction. The stone fraction is preferably dried and heated before being mixed with the motar. If desired, the stone fraction may be treated with a primer.

It is undesirable to prepare the composition by mixing bitumen with a mineral mixture obtained by mixing the minerals of the mortar with the stone fraction since in this case no durable composition is obtained.

As noted above, the bitumen content of the mortar is greater than corresponds to the volume of the voids in between the mineral components. The volume of the voids is dependent on the grading of the minerals in the mortar. As a rule the bitumen content is greater than 10% by weight, based on the mortar.

With compositions having a mortar content in excess of 30% the voids in between the stones of the stone fraction are usually completely filled. In this case these compositions are water-impermeable. When the mortar content is less than 10% the stones of the stone fraction are not completely coated with mortar and the stability of the composition against forces resulting from currents and wave action is insufficient. A composition having a mortar content of 15–20% by weight is preferred. These compositions have an optimum combination of stability and water permeability.

The bitumen used may be any conventional road building bitumen. Preferably, an unblown petroleum bitumen is selected. A fluxed bitumen can also be used.

As stated hereinbefore, the smallest size $D15$ of the stone fraction, expressed in equivalent diameters, is 4–16 times the greatest size $D85$ of the mortar minerals. If, for example, use is made of a mortar of bitumen, filler and sand, in which the greatest size $D85$ is 2 mm., the smallest size $D15$ of the stone fraction is 4–16 times 2 mm., i.e. a stone fraction having a smallest size $D15$ of 8–32 mm. If, in order to obtain for example a composition having a relatively high mechanical strength, it is desired to use a stone fraction of which for example the smallest stone size $D15$ is 10 cm., the greatest size $D85$ of the grains of the mortar minerals should be between 10–4 and 10–16 cm. For this purpose a mortar may be used containing stone chippings.

For coatings of slopes of harbours, shipping channels and rivers it is not essential and in view of the required thickness of the coating not desirable either to choose a large stone size for the stone fraction. For this type of coating a stone fraction of 4–8 cm. is particularly suitable, both in broken stone and in gravel, it being preferred to use a mortar percentage of approximately 15% by weight. In this case, the minerals used in the mortar are a mix of filler, sand and/or stone fines.

If desired the coating may be provided with an external reinforcement as described in the Netherlands patent application No. 6707673.

EXAMPLE I

A bituminous mortar having a temperature of 150° C. and consisting of 22% by weight of bitumen with a penetration of 80/100 dmm., 15% by weight of limestone filler and 63% by weight of sand A having a largest size D85 of 2.0 mm. (sand A is a graded sand in accordance with the "Specifications laid down by Rijkswaterstaat (State Water Authority) for building materials in Road Construction, 1967") was mixed with 25–55 mm. stone fraction (limestone) (having a smallest size D15 of 30 mm.), which had been heated to 120° C. The resultant composition contained 20% by weight of the mortar and 80% by weight of the stone fraction. The composition was used for coating a river slope. To this end, reinforcing mats of interwoven aluminium strips (thickness of the strips 0.2 mm., width 4 cm.) were covered with a 10 cm. thick layer of the hot composition. The operating temperature was approximately 110° C. The resultant coating mattresses, which had a length of 27 m. and a width of 7.5 m., were transported to the slope and laid on it. 14 mattresses were laid with their longitudinal sides adjoining so that the total length of defended slope was 14×7.5 m.=105 m.

EXAMPLE II

A bituminous mortar having a temperature of 120° C. and consisting of 23.5% by weight of fluxed bitumen, 15% by weight of limestone filler and 61.5% by weight of sand A (sand A as used in Example I) was mixed with 30–60 mm. (smallest size D15 32 mm.) gravel which had been heated to 90° C. The resultant composition contained 15% by weight of mortar and 85% by weight of gravel. The fluxed bitumen was composed of 85% by weight of unblown bitumen with a penetration of 60/70 dmm. and 15% by weight of 50/100 road asphalt (STV 30° C. 10 mm.). The composition was used for coating the slope of a groyne consisting of a dike of mine refuse with a 1:4 slope. The composition was applied on to the slope in a layer thickness of 50 cm. at an operating temperature of approximately 100° C.

EXAMPLE III

A bituminous mortar having a temperature of 160° C. and consisting of 20% by weight of bitumen (penetration 80/100 dmm.), 14% by weight of limestone filler and 66% by weight of graded sand (D85 2.0 mm.) was mixed with 30–100 mm. (D15 32 mm.) gravel having an ambient temperature of 30° C. The resultant composition contained 15% by weight of mortar and 85% by weight of gravel. The composition was used for coating the slope of a groyne consisting of a dike of mine refuse with a 1:4 slope. The composition was applied on the slope in a layer thickness of 50 cm. at an operating temperature of approximately 80° C.

We claim:
1. A water-permeable bituminous composition for hydraulic engineering applications consisting essentially of a mixture of (1) a stone fraction and (2) a bituminous mortar containing bitumen and mineral components, said bituminous mortar consisting of from 10% to 30% of the total weight of the mixture, said stone fraction having individual stones defining voids therebetween and said bituminous mortar being of a sufficient quantity to completely coat the stones of the stone fraction but not sufficient to completely fill the voids between the stones of the stone fraction thereby leaving some void space for the passage of water through the stone fraction of the mixture; and said mixture being further characterized in that the smallest sieve mesh size D15 through which fifteen percent (15%) by weight of the stones in the stone fraction pass is from four (4) to sixteen (16) times the largest sieve mesh size D85 through which eighty-five percent (85%) by weight of the minerals in the bituminous mortar pass.

2. The water-permeable bituminous composition of claim 1 in which the bitumen material of the bituminous mortar is selected from the group consisting of petroleum, coal tar and coal tar pitch; and the mineral material of the bituminous mortar is selected from the group consisting of sand, stone fines, stone chippings, and gravel.

3. The water-permeable bituminous composition of claim 2 in which the bitumin material consists of from 10 to 25% by weight of the bituminous mortar.

4. The water-permeable bituminous composition of claim 1 in which the smallest stone size D15 in the stone fraction is from 8 mm. to 32 mm. and the largest size D85 of the mineral components of the bituminous mortar is 2 mm.

5. The water-permeable bituminous composition of claim 1 in which the bitumen material content is from 10% to 25% of the total weight of the mortar.

6. The water-permeable bituminous composition of claim 5 in which the mineral material is sand having a largest size D85 of 2.0 mm.

7. A process for coating foundations for hydraulic engineering applications, characterized in that the water-permeable composition of claim 1 is used as the coating.

References Cited

UNITED STATES PATENTS

| | | | |
|---|---|---|---|
| 1,704,771 | 3/1929 | Spence | 94—23 |
| 1,720,101 | 7/1929 | Souter | 94—23 |
| 1,740,718 | 12/1929 | Wallace | 94—23 |
| 1,987,151 | 1/1935 | Mason | 106—281 R |
| 3,434,540 | 3/1969 | Stein | 61—30 X |

OTHER REFERENCES

Abraham, Asphalts and Allied Substances, 6th ed. vol. three, N.Y., D. Van Nostrand Company Inc. TN853, A35, 1960 C. 3, pp. 140 to 145, 172, 173 and 176 to 180 relied on.

The Asphalt Handbook, July 1962 edition, 2nd printing, March 1963, Manual Series No. 4, published by The Asphalt Institute, TE 270.A65 1962, pp. 142–5, 310–25, 330–33 relied on.

JOAN B. EVANS, Primary Examiner

U.S. Cl. X.R.

61—10, 11, 30; 94—20; 106—281